(12) United States Patent
Trimble

(10) Patent No.: US 7,168,247 B1
(45) Date of Patent: Jan. 30, 2007

(54) CHARGE PUMP

(75) Inventor: Robert E. Trimble, Sullivan, IL (US)

(73) Assignee: Hydro-Gear Limited Partnership, Sullivan, IL (US)

(*) Notice: Subject to any disclaimer, the term of this patent is extended or adjusted under 35 U.S.C. 154(b) by 38 days.

(21) Appl. No.: 10/897,960

(22) Filed: Jul. 23, 2004

Related U.S. Application Data

(60) Provisional application No. 60/489,617, filed on Jul. 24, 2003.

(51) Int. Cl.
*F16D 31/02* (2006.01)

(52) U.S. Cl. ........................................... 60/488

(58) Field of Classification Search .................. 60/488
See application file for complete search history.

(56) References Cited

U.S. PATENT DOCUMENTS

| | | | |
|---|---|---|---|
| 3,348,491 A | 10/1967 | Stephens et al. | |
| 3,563,674 A | 2/1971 | Moffat et al. | |
| 3,736,072 A | 5/1973 | Turner et al. | |
| 3,922,113 A | 11/1975 | Turner | |
| 3,946,562 A * | 3/1976 | Ross | 60/464 |
| 4,002,028 A * | 1/1977 | Budzich | 60/464 |
| 4,341,073 A * | 7/1982 | Spivey | 60/488 |
| 4,408,961 A | 10/1983 | Laybourne | |
| 4,723,571 A | 2/1988 | Haynes | |
| 5,037,247 A | 8/1991 | Kaiser et al. | |
| 5,555,727 A | 9/1996 | Hauser et al. | |
| 5,628,189 A | 5/1997 | Hauser et al. | |
| 5,715,798 A | 2/1998 | Bacon et al. | |
| 5,819,535 A | 10/1998 | Smothers et al. | |
| 5,979,270 A * | 11/1999 | Thoma et al. | 60/487 |
| RE36,807 E | 8/2000 | Okada | 60/488 |
| 6,572,339 B2 | 6/2003 | Walton et al. | |
| 6,575,705 B2 | 6/2003 | Akiyama et al. | |
| 6,953,327 B1 * | 10/2005 | Hauser et al. | 60/486 |

* cited by examiner

*Primary Examiner*—F. Daniel Lopez
(74) *Attorney, Agent, or Firm*—Neal, Gerber & Eisenberg LLP

(57) ABSTRACT

A charge pump for hydraulic drive device such as a hydrostatic transmission or integrated hydrostatic transaxle using hydraulic porting having high and low pressure sides mounted in a sump to connect a hydraulic pump and motor. The charge pump comprises a body connected between the high and low pressure sides of the porting to pull hydraulic fluid from a charge sump to the low pressure side of the porting.

24 Claims, 9 Drawing Sheets

CHARGE PUMP

CROSS-REFERENCE TO RELATED APPLICATION

This patent application claims priority of U.S. Patent Application No. 60/489,617 filed on Jul. 24, 2003. The terms of that application are incorporated herein by reference.

FIELD OF THE INVENTION

This invention relates generally to the design of a charge pump for hydrostatic transmissions and hydraulic pumps. Hydrostatic transmissions come in a variety of configurations, including parallel pump and motor, dual pump and motor, and configurations where the hydrostatic transmission is incorporated within a housing containing gearing, often known as an integrated hydrostatic transaxle or IHT.

BACKGROUND OF THE INVENTION

Charge pumps commonly used in association with hydrostatic pumps and transmissions are of the gerotor type. One such charge pump is shown in U.S. Pat. No. 5,557,931, the terms of which are incorporated herein by reference. The charge pump shown in that patent is affixed to an exterior surface of the housing and is driven by an input shaft. In another known configuration, the charge pump is located within the same housing as the center section on which rotating components are mounted, in the space between the center section and an internal surface of the housing.

While these charge pumps serve an important function, they are relatively costly. Furthermore, in the aforementioned designs the charge pumps are attached at a position on the underside of a center section, potentially increasing the required housing size and/or reducing ground clearance. Also, it is often necessary to provide complicated connections between the prior art charge pump and the hydraulic porting of a pump or hydrostatic transmission. Thus, there is a need for a charge pump of reduced size, complexity and cost.

SUMMARY OF THE INVENTION

A charge pump that makes use of the Venturi principle is disclosed herein. This charge pump is positioned within a center section and operates passively to provide fluid to the porting of a hydraulic system. Such a pump may also be referred to as a jet pump. A pump cartridge desirable for high-volume production is also disclosed herein.

Other benefits and objects of this invention are disclosed herein and will be obvious to readers of ordinary skill in the art. The features disclosed herein can be combined to create a unique design; it is understood, however, that such features are unique in their own right and can be used independently with other transmission, transaxle or vehicle designs, as will be obvious to one of ordinary skill in the art.

DETAILED DESCRIPTION OF THE DRAWINGS

Figure 1:
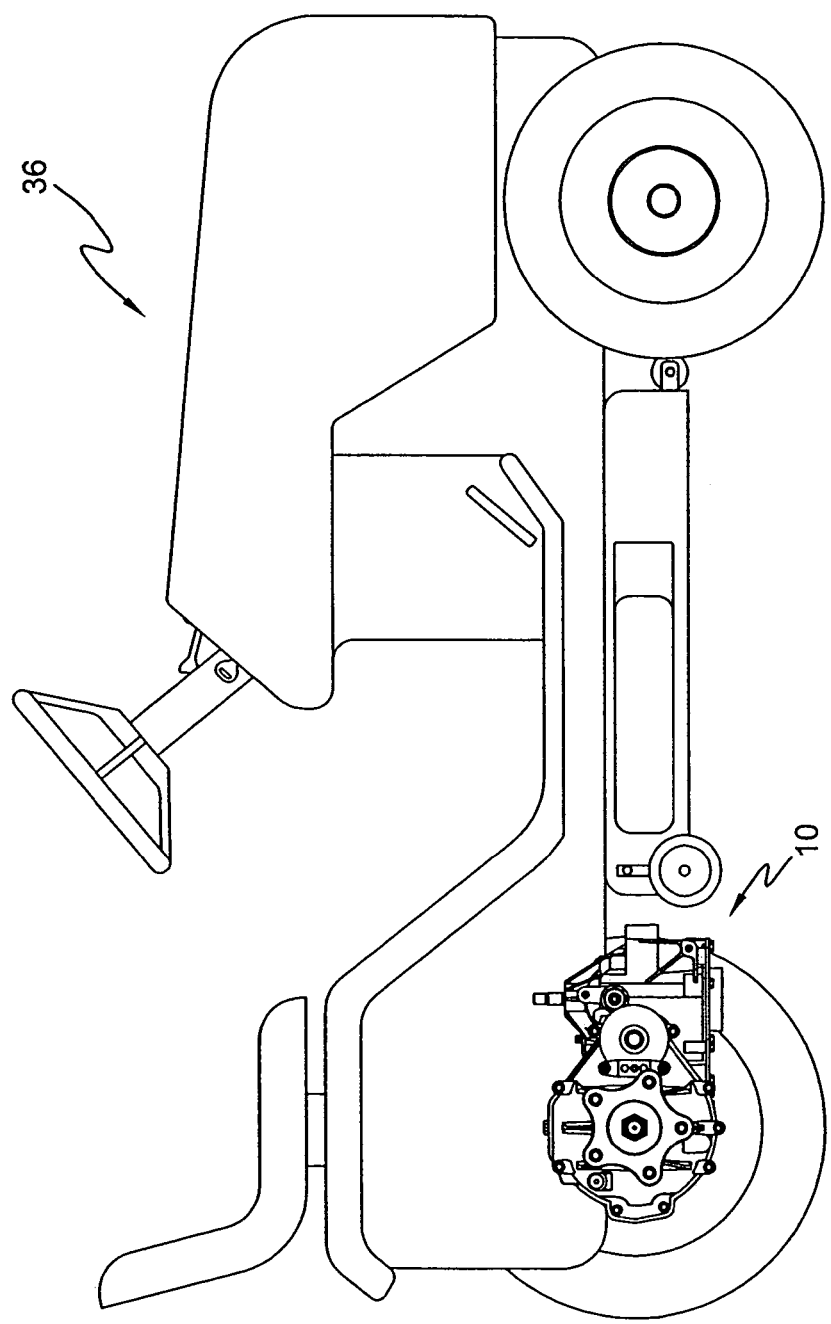
FIG. 1 is a side elevation view of a vehicle incorporating a hydrostatic transaxle incorporating the invention.

FIG. 1 shows a simplified vehicle 36 in which an exemplary hydrostatic transaxle 10 is mounted. The invention will be described within the context of integrated hydrostatic transaxle 10, as shown in more detail in FIGS. 2–4. Transaxle 10 is generally similar to that depicted in U.S. Pat. No. 5,782,717, the terms of which are incorporated herein by reference. However, the invention is suitable for use in any pump and motor configuration wherein the pump and motor are connected by porting to form a generally closed loop system, and wherein the pump may be installed to interface with the two sides of the closed loop system and a system sump or reservoir.

Figure 2:
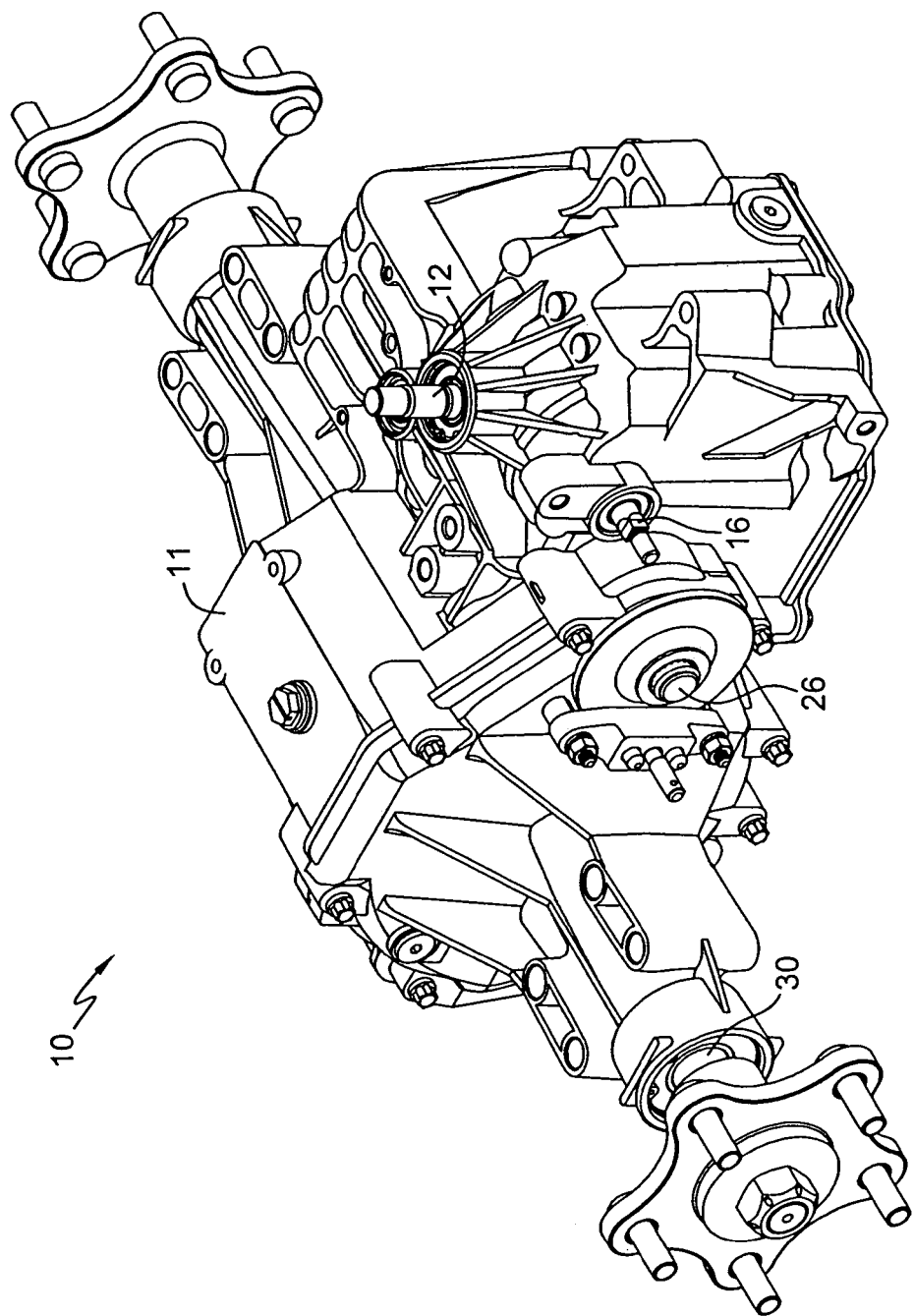
FIG. 2 is a perspective view of the transaxle shown in FIG. 1.
Figure 3:
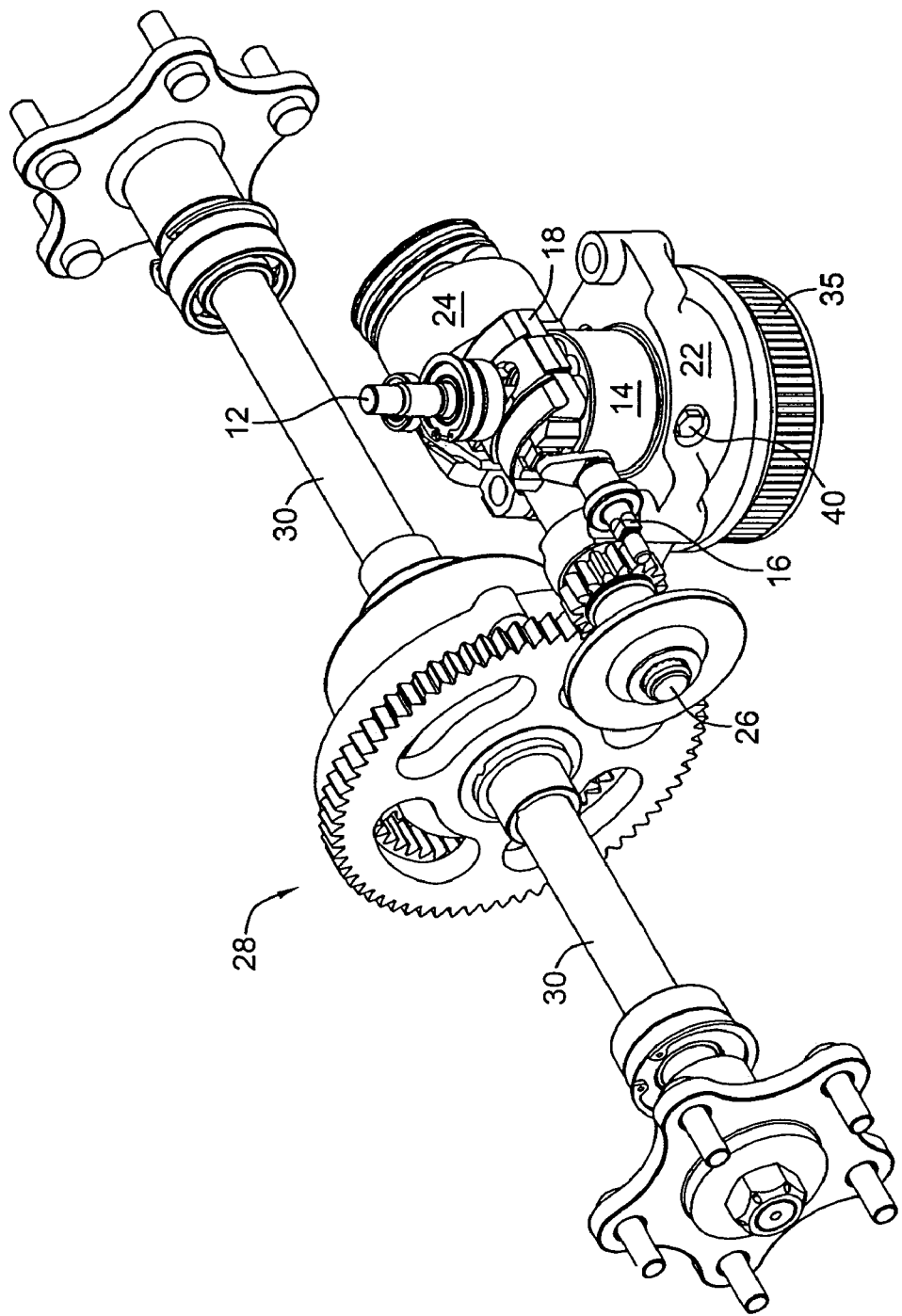
FIG. 3 is a perspective view of the internal components of the transaxle shown in FIG. 2.

FIG. 3 is a perspective view of the significant internal components of transaxle 10 from FIG. 2. Transaxle 10 is driven by a vehicle prime mover such as an engine (not shown) connected to input shaft 12. Housing 11 forms an internal main sump in which the hydrostatic and gear components described herein operate.

Input shaft 12 extends into housing 11 to rotate pump 14. A control member 16, which may be a trunnion or the like, is moved by means of a linkage or remote control (not shown) by an operator to effect the movement of swash plate 18, which then controls the amount of fluid displaced by pump 14. The fluid displaced by pump 14 moves by means of porting 20A and 20B located within center section 22 to cause movement of motor 24. Motor 24 is drivingly connected to motor shaft 26, which drives gearing 28. Gearing 28 may include a differential to drive multiple output shafts 30 or may drive a single output shaft 30. Output shafts 30 may also function as axle shafts to drive a sprocket, such as that used by a crawler, or a wheel.

Figure 4:
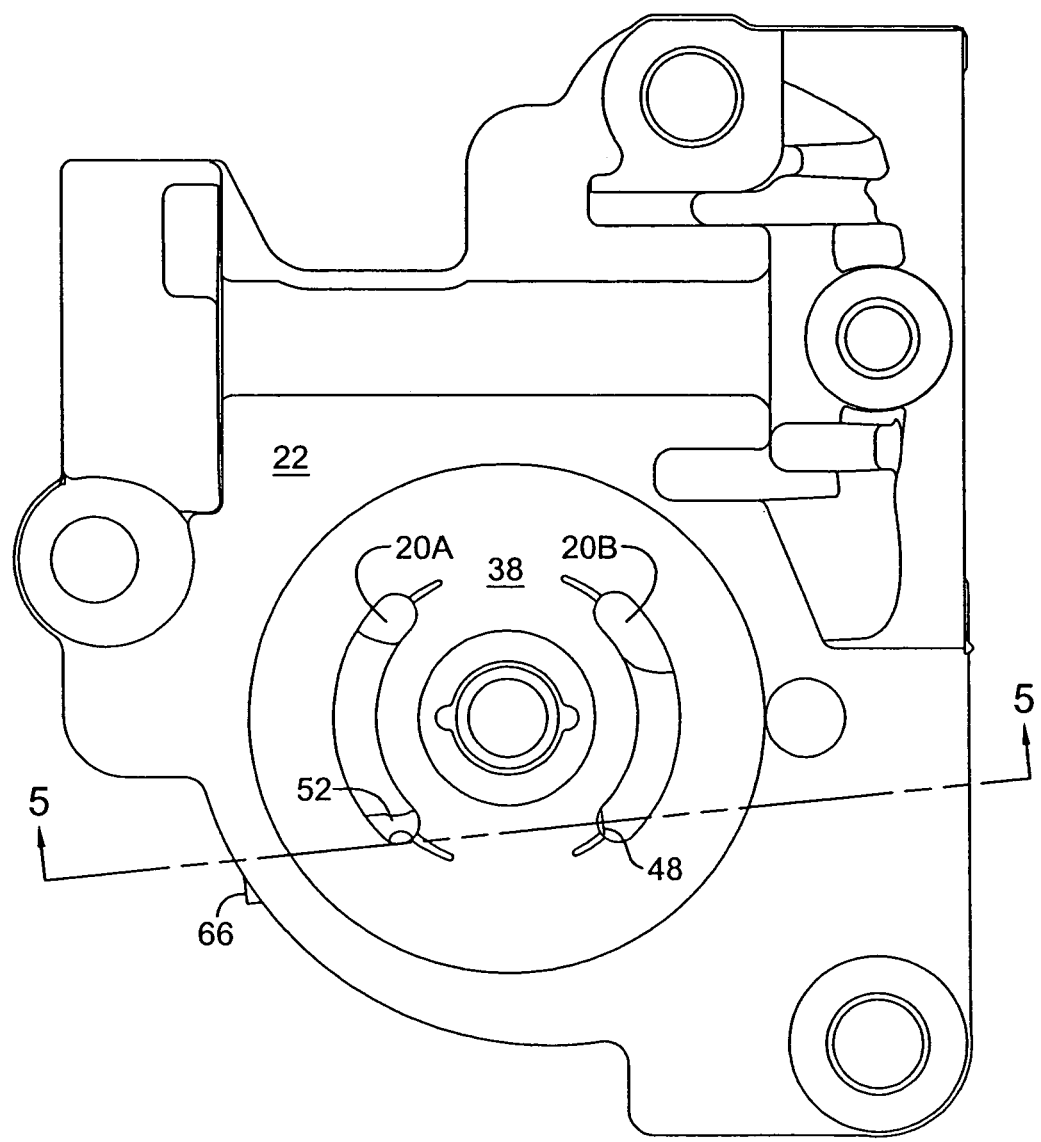
FIG. 4 is a top plan view of the center section from the transaxle shown in FIG. 2.
Figure 5:
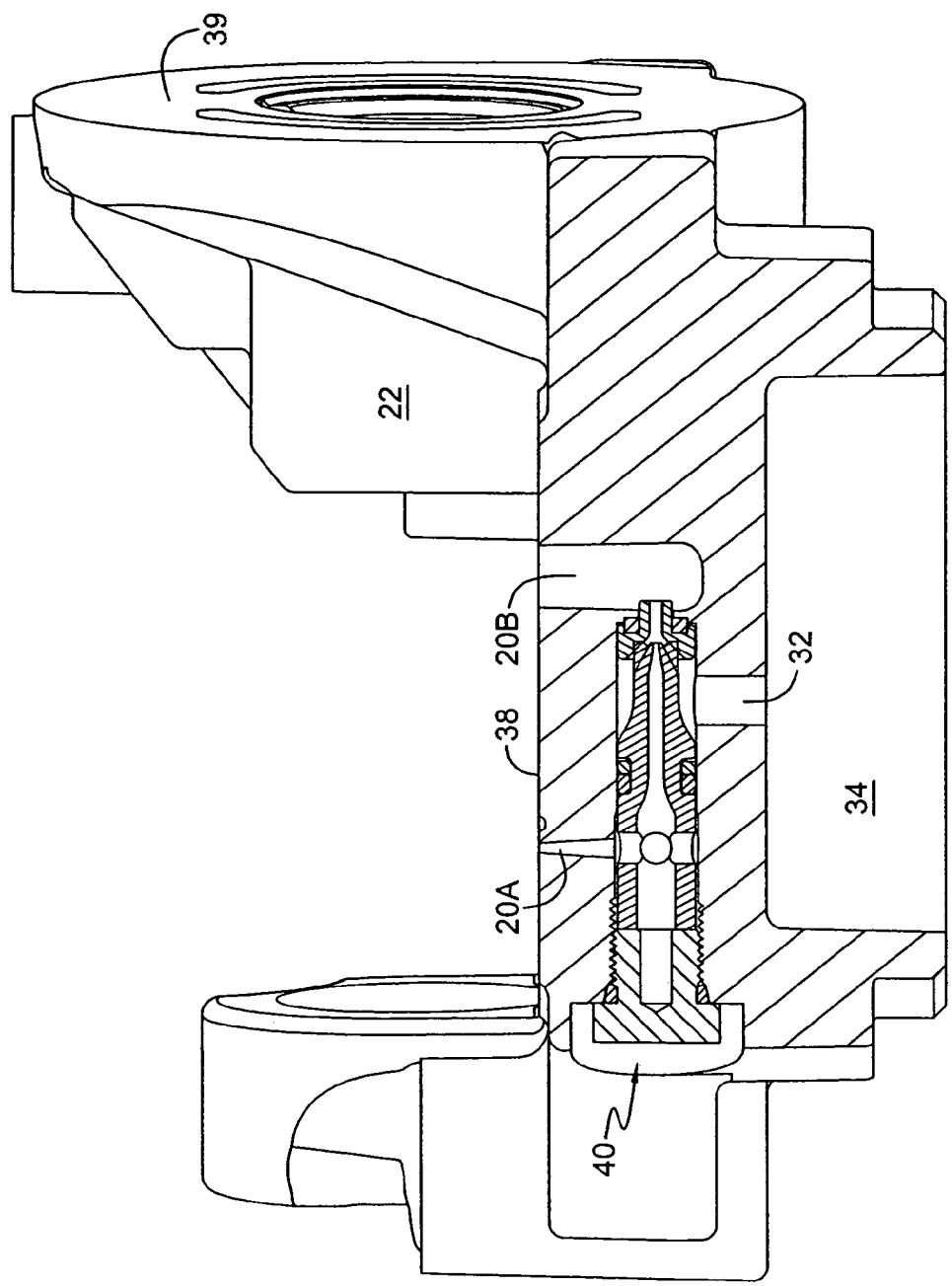
FIG. 5 is a section view along the lines 5—5 in FIG. 4.
Figure 6:
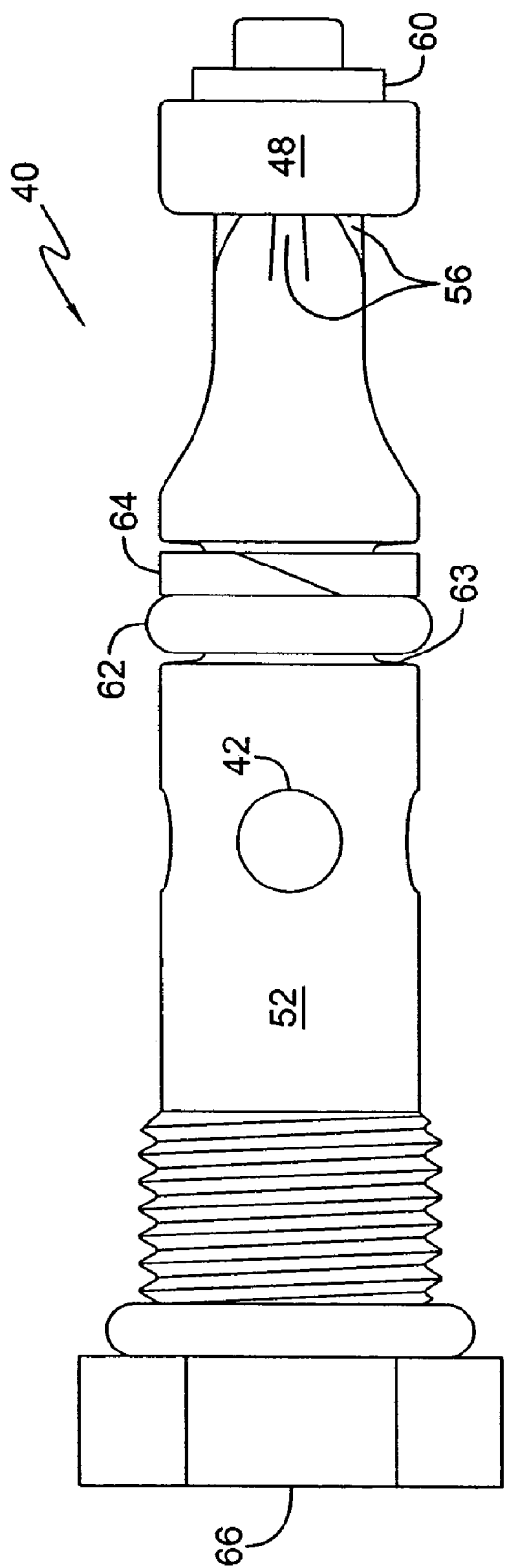
FIG. 6 is a side view of the charge pump shown in FIGS. 4 and 5.
Figure 7:
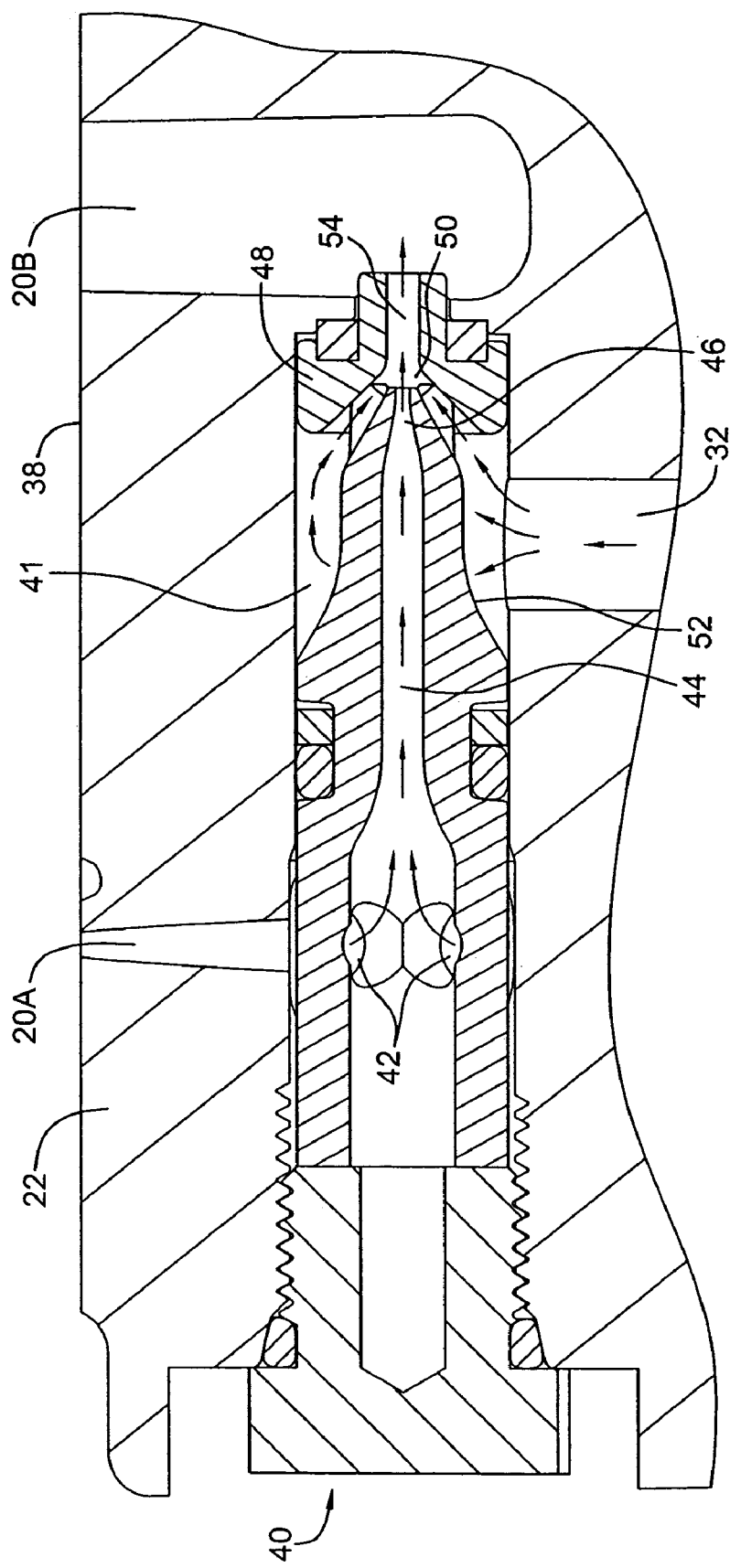
FIG. 7 is a section view similar to that of FIG. 5 with the charge pump rotated by 45 degrees about its central axis as compared to FIG. 5.

FIGS. 4 and 5 illustrate an exemplary center section 22 having a pump running surface 38 and a motor running surface 39. A charge pump 40 mounted in port 41 in the body of center section 22, as shown in FIG. 7. A filter 35 is attached to the bottom of center section 22; it could be mounted in other locations as well. Charge pump 40 is positioned between ports 20A and 20B, and is further connected by means of inlet 32 to a charge sump 34 which is formed by the center section 22 and a filter 35 or cap (not shown) in order to segregate the filtered fluid of charge sump 34 from the main sump formed in housing 11. Ports 20A and 20B are part of the porting that connects the hydraulic pump cylinder block 14 and the hydraulic motor cylinder block 24. It will be understood that whether port 20A or 20B is under high pressure will depend on whether the unit is being driven in forward or reverse. The shape of the center section is not critical, and the same function could be performed by different center sections or a port block, by having the porting formed in the housing, or other means known in the art. For a more detailed description of the particular center section described herein, absent the charge pump feature, the reader is directed to U.S. Pat. No. 5,314,387, the terms of which are incorporated herein by reference.

Figure 8:
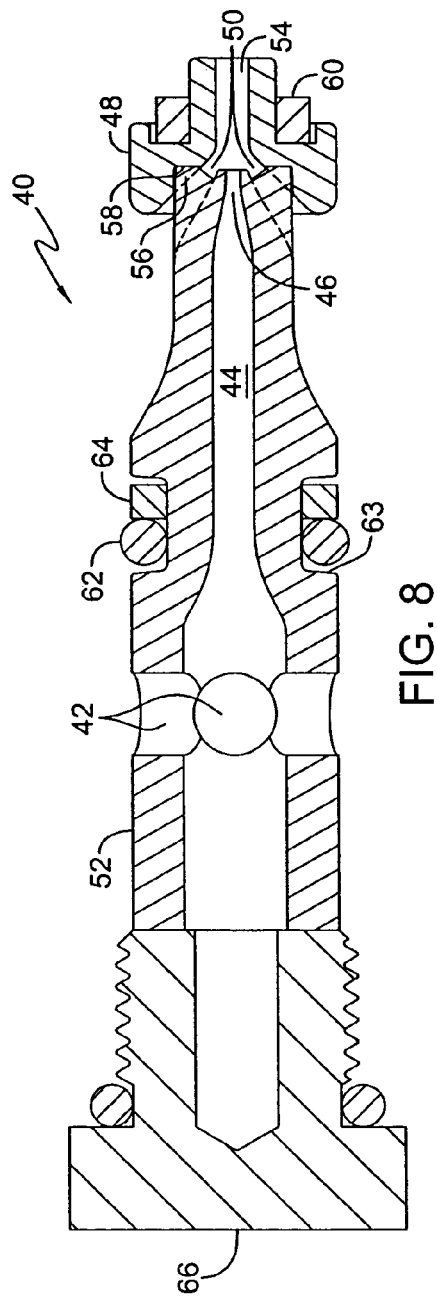
FIG. 8 is a section view of the charge pump of FIG. 6 similar to the section shown in FIG. 5.

The functioning of charge pump 40 is shown most clearly in FIGS. 7 and 8. When hydraulic pressure is generated in port 20A, fluid travels into inlet openings 42 and then into central passage 44. As the pressurized fluid travels through central passage 44 to nozzle 46, the reduction in diameter increases the speed of fluid flow. As the fluid travels from the end of nozzle 46 across open area 50 and enters exit nozzle 48, the fluid velocity causes a vacuum pressure effect that forces fluid from charge sump 34 through inlet 32 into port 41 and thereafter into the open areas 50 between pump body 52 and exit nozzle 48. The combination of fluid from port 20A and the fluid pulled from sump 34 creates pressure in port 20B, thus charging or pressurizing port 20B.

The fluid entering inlet 32 is generally filtered by a variety of methods, and charge sump 34 may be located within housing 11 or may be in a separate reservoir (not shown) connected to inlet 32, typically with an inline filter (not shown) either internal or external to housing 11.

While the operation described above works well when port 20A is pressurized, the behavior of this device when port 20B is pressurized must also be considered, as pressurization of ports 20A and 20B typically correspond to forward and reverse directions of travel for vehicle 36. The charge feature of this design will work in only one direction (preferably forward). The dimensions of opening 54 and open areas 50 must be sized such that leakage through these features will allow pressure to build to a desired operational level in port 20B when in the reverse driving mode, while still functioning to build charge pressure in port 20B when operating in the forward driving mode.

In one variation, using a 10 cc pump block and a 21 cc motor block, nozzle 46 was chosen to have a 0.016 inch diameter, opening 54 was chosen to have a 0.025 inch diameter, and the spacing between pump body 52 and exit nozzle 48 was chosen to be 0.075 inches, yielding charge pressures in port 20B up to 1.8 PSI with system pressure in port 20A of approximately 3600 PSI.

In another variation, also using a 10 cc pump block and a 21 cc motor block, nozzle 46 was chosen to have a 0.028 inch diameter, opening 54 was chosen to have a 0.046 inch diameter, and the spacing between pump body 52 and exit nozzle 48 was kept at 0.075 inches, yielding charge pressures in port 20B in excess of 100 PSI with system pressure of approximately 1300 PSI in port 20A. The exemplary diameters yield acceptable charge pressure values, and yet are comparable to bleed orifices often used in such hydraulic systems to expand system neutral, thus allowing elimination of such bleed orifices while providing acceptable performance in the reverse direction of operation. Other dimensions could be used depending upon system requirements.

While only one charge pump 40 is shown between ports 20A and 20B, it may be desirable in some applications to include a second charge pump 40 between ports 20B and 20A, oriented such that when port 20B is pressurized, charge pressure is provided to port 20A. The addition of a second charge pump will enable the unit to have a charge pump feature in both forward and reverse directions of operation. Also, because charge pump 40 is intended to provide sufficient make up fluid to port 20B as shown, an additional valve such as a check valve between sump 34 and port 20B may not be required. Similarly, if a second pump 40 is provided between ports 20B and 20A, then a check valve between sump 34 and port 20A may not be required. Check valves may be still desirable in certain applications.

Figure 10:
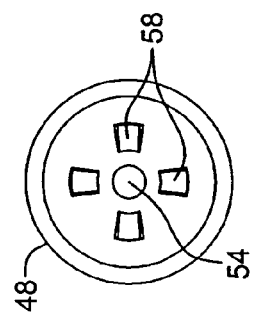
FIG. 10 is an end view of the exit nozzle portion of the charge pump assembly.
Figure 9:
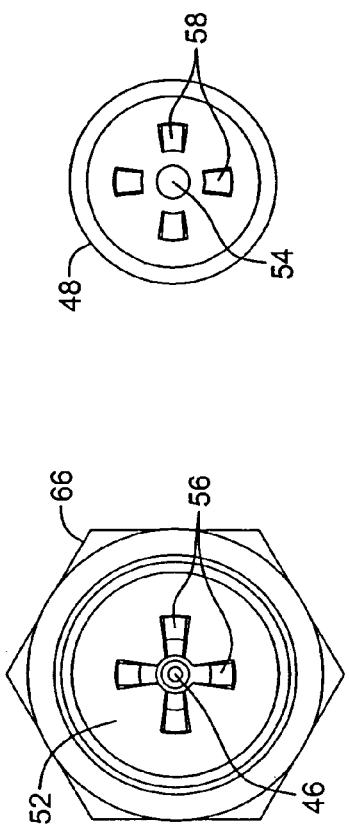
FIG. 9 is an end view of the charge pump body.

In order to maintain production efficiencies, it is preferable that such a pump be preassembled as much as possible. FIGS. 8–10 depict a partially preassembled configuration of pump 40. Pump body 52 comprises projections 56 that may be brazed or press fit into recesses 58 in exit nozzle 48. Seal 60, which is preferably an elastomeric material, fits onto exit nozzle 48 and is retained by the grip of seal 60 on exit nozzle 48, though other methods of retention may be used. Seal 60 is an optional seal to prevent fluid flow about the periphery of exit nozzle 48, particularly when port 20B is under pressure. The gap between exit nozzle 48 and charge pump port 41 adds uncertainty to the leakage area when port 20B is under pressure, and seal 60 thus acts to eliminate that additional uncertainty. O-ring 62 prevents undesired leakage about the periphery of pump body 52 and is located in a groove 63 on pump body 52. A backup ring 64 may also be positioned in groove 63 and used to prevent extrusion of O-ring 62 when port 20A is under pressure. All the components described, including pump body 52, exit nozzle 48, seal 60, O-ring 62 and backup ring 64, are assembled as a single device suitable for positioning in an appropriately sized port 41, and then restrained by a plug 66.

Figure 11:
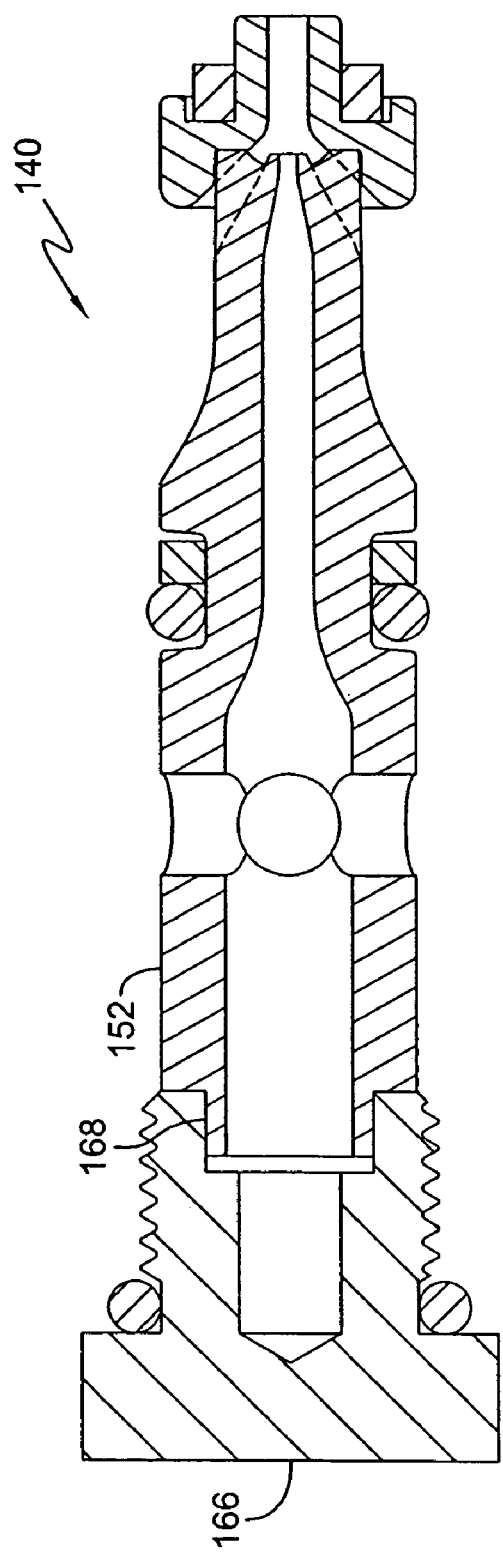
FIG. 11 is a section view of another embodiment of the charge pump in accordance with the present invention.

Another embodiment of the invention is presented in FIG. 11. In this embodiment, charge pump 140 is a single assembly that includes components similar to that of the first embodiment mated with plug 166. The mating feature 168 between plug 166 and pump body 152 may be a press fit interface, a brazed interface, or other mating interfaces known in the art. This embodiment may be completely assembled away from the assembly line and then installed into an appropriate port 41 during the manufacturing process.

Fabrication of small parts such as pump body 52 and nozzle 48 can represent a challenge. For this reason, metal injection molding (MIM) is preferred as the fabrication technique for such parts.

It is to be understood that the above description of the invention should not be used to limit the invention, as other embodiments and uses of the various features of this invention will be obvious to one skilled in the art. This invention should be read as limited by the scope of its claims only.

The invention claimed is:

1. A hydraulic drive device comprising:
    a housing comprising a main sump;
    a hydrostatic transmission mounted in the main sump and comprising a hydraulic pump and a hydraulic motor connected together through porting, and the porting comprises a first pressure side connecting the hydraulic pump and the hydraulic motor and a second pressure side connecting the hydraulic pump and the hydraulic motor, wherein during operation of the hydrostatic transmission, one of the pressure sides is at low pressure and the other pressure side is at high pressure;
    a charge sump hydraulically connected to the hydrostatic transmission; and
    a charge pump hydraulically connected to the charge sump and comprising a first opening proximate to only the first pressure side and a second opening proximate to only the second pressure side, wherein the charge pump is capable of providing charge fluid only to the second pressure side.

2. A hydraulic drive device as set forth in claim 1, wherein the hydrostatic transmission further comprises a center section on which the hydraulic pump and hydraulic motor are mounted.

3. A hydraulic drive device as set forth in claim 2, wherein the porting is formed within the center section.

4. A hydraulic drive device as set forth in claim 1, wherein the charge pump comprises a venturi pump.

5. A hydraulic drive device as set forth in claim 1, wherein the hydrostatic transmission further comprises a center section on which the hydraulic pump and hydraulic motor are mounted; and the charge pump comprises a venturi pump mounted in the center section.

6. A hydraulic drive device as set forth in claim 1, wherein the charge sump is located in and separate from the main sump.

7. A hydraulic drive device as set forth in claim 2, wherein the charge sump is formed as part of the center section.

8. A hydraulic drive device comprising:
a housing comprising a main sump;
a hydrostatic transmission mounted in the main sump and comprising a hydraulic pump and a hydraulic motor connected together through porting having a first and second pressure sides;
a charge sump hydraulically connected to the hydrostatic transmission;
a first charge pump connected between the first and second pressure sides of the porting to pull hydraulic fluid from the charge sump to the second pressure side; and
a second charge pump connected between the first and second pressure sides of the porting to pull hydraulic fluid from the charge sump to the first pressure side.

9. A hydraulic drive device as set forth in claim 8, further comprising a gear train and at least one axle mounted in the housing and drivingly connected to the hydraulic motor.

10. A hydraulic drive device as set forth in claim 8, wherein the charge sump is located in and separate from the main sump.

11. A hydraulic drive device as set forth in claim 8, wherein the charge sump is formed as part of the center section.

12. A charge pump for a hydrostatic transmission having a hydraulic pump connected to a hydraulic motor through hydraulic porting, wherein the hydraulic porting has a first pressure side connected between the hydraulic pump and the hydraulic motor, and a second pressure side connected between the hydraulic pump and the hydraulic motor wherein, during operation of the hydrostatic transmission, one of the pressure sides is at low pressure and the other pressure side is at high pressure, the charge pump comprising:
a charge pump body mounted between the first and second pressure sides of the hydraulic porting;
a first opening formed in the charge pump body and connected only to the first pressure side of the hydraulic porting, whereby the charge pump can fluidly communicate with only the first pressure side through the first opening;
a second opening formed in the charge pump body and connected only to the second pressure side of the hydraulic porting, whereby the charge pump can fluidly communicate with only the second pressure side through the second opening; and
a third opening located adjacent to the second opening, whereby hydraulic fluid is pulled from a charge sump through the third opening to provide charged fluid only to the second pressure side through the second opening, when the second pressure side is at low pressure.

13. An axle driving apparatus comprising:
a unitary center section having hydraulic porting formed therein;
a hydraulic pump and hydraulic motor mounted on the center section and connected to one another through the hydraulic porting;
a charge pump mounted inside the body of the unitary center section and connected to the hydraulic porting and a housing, wherein the center section, hydraulic pump and hydraulic motor are mounted entirely within the housing.

14. An axle driving apparatus as set forth in claim 13, further comprising a gear train and at least one axle mounted in the housing and drivingly connected to the hydraulic motor.

15. A hydraulic drive device comprising:
a housing comprising a main sump;
a hydrostatic transmission mounted in the main sump and comprising a hydraulic pump and a hydraulic motor connected together through porting, and the porting comprises a first pressure side connecting the hydraulic pump and the hydraulic motor and a second pressure side connecting the hydraulic pump aid the hydraulic motor, wherein during operation of the hydrostatic transmission, one of the hydraulic pressure sides is at low pressure and the other hydraulic pressure side is at high pressure;
a charge sump hydraulically connected to the hydrostatic transmission; and
a charge pump hydraulically connected to the charge sump, the charge pump comprising an inlet, through which the charge pump receives fluid from only the first pressure side, and an outlet, through which the charge pump body receives fluid from only the second side, whereby when the first pressure side is under high pressure with respect to the second pressure side, hydraulic fluid is transferred from the first pressure side to the second pressure side through the charge pump and hydraulic fluid is pulled from the charge sump to the second pressure side by the charge pump, and wherein the charge pump outlet is sized to limit fluid flow from the second pressure side to the first pressure side when the second pressure side is under high pressure with respect to the first pressure side.

16. A hydraulic drive device as set forth in claim 15, wherein the hydrostatic transmission further comprises a canter section on which the hydraulic pump and hydraulic motor are mounted and the porting is formed within the center section.

17. A hydraulic drive device as set forth in claim 16, wherein the charge pump comprises a venturi pump mounted in the center section.

18. A hydraulic drive device as set forth in claim 15, wherein the charge sump is mounted in the main sump.

19. A hydraulic drive device as set forth in claim 16, wherein the charge sump is formed as part of the center section.

20. A hydraulic drive device, comprising:
a housing comprising a main sump;
a hydrostatic transmission mounted in the main sump and comprising a hydraulic pump and a hydraulic motor connected together through porting, and the porting comprises a first pressure side connecting the hydraulic pump and the hydraulic motor and a second pressure side connecting the hydraulic pump and the hydraulic motor, wherein during operation of the hydrostatic transmission, one of the hydraulic pressure sides is at low pressure and the other hydraulic pressure side is at high pressure:
- a charge sump hydraulically connected to the hydrostatic transmission; and
- a first charge pump hydraulically connected to the charge sump and comprising an inlet connected to the first pressure side and an outlet connected to the second pressure side, whereby when the first pressure side is under high pressure with respect to the second pressure side, hydraulic fluid is transferred from the first pressure side to the second pressure side through the first charge pump and hydraulic fluid is pulled from the charge sump to the second pressure side by the first charge pump; and
- a second charge pump hydraulically connected to the charge sump, the second charge pump comprising an inlet connected to the second pressure side and an outlet connected to the first pressure side, whereby when the second pressure side is under high pressure with respect to the first pressure side, hydraulic fluid is transferred from the second pressure side to the first pressure side through the second charge pump and hydraulic fluid is pulled from the charge sump to the first pressure side by the second charge pump.

21. A hydraulic drive device as set forth in claim 20, wherein the hydrostatic transmission further comprises a center section on which the hydraulic pump and hydraulic motor are mounted and the porting is within the center section, and both the first and second charge pumps are mounted in the center section.

22. A hydraulic drive device as set forth in claim 20, wherein the first and second charge pumps both comprise a venturi pump.

23. A hydrostatic transmission comprising:
- a hydraulic pump and a hydraulic motor connected together through hydraulic porting, the hydraulic porting comprising a first pressure side connecting the pump to the motor and a second pressure side connecting the hydraulic pump and the hydraulic motor; and
- a venturi charge pump hydraulically connected to a charge sump and comprising an inlet connected to, and receiving fluid into the venturi charge pump from only, one of the pressure sides, and an outlet connected to, and discharging fluid from the venturi charge pump to, the other pressure side, wherein the venturi charge pump is capable of providing charged pressure to only the other side.

24. A hydrostatic transmission set forth in claim 23, further comprising:
- a housing, wherein the hydraulic pump and motor are mounted entirely within the housing;
- a gear train mounted in the housing and connected to the output of the hydraulic motor; and
- at least one axle mounted in the housing and extending therefrom, whereby the axle is connected to and driven by the gear train.

* * * * *